US008890973B2

(12) United States Patent
Shimizu

(10) Patent No.: US 8,890,973 B2
(45) Date of Patent: Nov. 18, 2014

(54) IMAGE PROCESSING APPARATUS, IMAGE PROCESSING METHOD, AND STORAGE MEDIUM

(71) Applicant: Canon Kabushiki Kaisha, Tokyo (JP)

(72) Inventor: Yusuke Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/867,301

(22) Filed: Apr. 22, 2013

(65) Prior Publication Data

US 2013/0278793 A1 Oct. 24, 2013

(30) Foreign Application Priority Data

Apr. 24, 2012 (JP) ................................ 2012-099003

(51) Int. Cl.
*H04N 9/73* (2006.01)
*G06K 9/00* (2006.01)
*H04N 1/60* (2006.01)

(52) U.S. Cl.
CPC ............. *H04N 9/735* (2013.01); *H04N 1/6086* (2013.01)
USPC ....................................... 348/223.1; 382/167

(58) Field of Classification Search
CPC ........ H04N 9/735; H04N 9/73; H04N 1/6086
USPC ........................................... 348/223.1, 225.1
See application file for complete search history.

(56) References Cited

U.S. PATENT DOCUMENTS

| | | | | |
|---|---|---|---|---|
| 8,009,201 | B2 * | 8/2011 | Takayama | 348/223.1 |
| 8,089,525 | B2 * | 1/2012 | Takayama | 348/222.1 |
| 8,160,310 | B2 * | 4/2012 | Takayama | 382/167 |
| 8,471,924 | B2 * | 6/2013 | Nagoya | 348/223.1 |
| 8,704,911 | B2 * | 4/2014 | Shimizu | 348/223.1 |
| 2008/0094484 | A1 * | 4/2008 | Wu | 348/223.1 |
| 2009/0002519 | A1 * | 1/2009 | Nakamura | 348/223.1 |
| 2009/0021602 | A1 * | 1/2009 | Fujiwara et al. | 348/223.1 |
| 2010/0026835 | A1 * | 2/2010 | Negishi et al. | 348/223.1 |
| 2011/0176030 | A1 * | 7/2011 | Ikeda et al. | 348/223.1 |
| 2012/0057045 | A1 * | 3/2012 | Shimizu | 348/223.1 |
| 2013/0057725 | A1 * | 3/2013 | Takayama | 348/223.1 |
| 2013/0057726 | A1 * | 3/2013 | Shimizu | 348/224.1 |
| 2013/0128073 | A1 * | 5/2013 | Seok et al. | 348/223.1 |
| 2013/0321667 | A1 * | 12/2013 | Saito, Junichi | 348/235 |
| 2013/0342724 | A1 * | 12/2013 | Kitajima | 348/223.1 |

FOREIGN PATENT DOCUMENTS

JP 4320998 B2 8/2009

* cited by examiner

*Primary Examiner* — John Villecco

(74) *Attorney, Agent, or Firm* — Canon USA Inc. IP Division

(57) ABSTRACT

An image processing apparatus includes a first calculation unit configured to calculate a first white balance correction value for correcting white balance for image data based on a pixel value in a divided region, among a plurality of divided regions into which the image data is divided, where a color evaluation value is within a predetermined color range, and a second calculation unit configured to calculate, if the first white balance correction value is at a high temperature side of a predetermined threshold value, a second white balance correction value for correcting white balance for the image data based on a pixel value in a divided region within a color range where a color range at a low temperature side of the predetermined color range is limited.

17 Claims, 12 Drawing Sheets

IMAGE PROCESSING APPARATUS, IMAGE PROCESSING METHOD, AND STORAGE MEDIUM

BACKGROUND OF THE INVENTION

1. Field of the Invention

The present disclosure generally relates to image processing and, more particularly, to a white balance control technique used for image data.

2. Description of the Related Art

Generally, an imaging apparatus using an image sensor, such as a digital camera or a digital video camera, includes a white balance control function of adjusting color tones of captured images. Examples of such white balance control include manual white balance control and auto white balance control. In manual white balance control, an image of a white object is previously captured and white balance coefficients are calculated. The calculated white balance coefficients are then applied to the entire screen. In contrast, in auto white balance control, portions deemed to be white are automatically detected from a captured image and white balance coefficients are calculated from average values of the individual color components on the entire screen. The calculated white balance coefficients are then applied to the entire screen.

Hereinafter, conventional auto white balance control will briefly be described. In conventional auto white balance control, a color evaluation value is calculated for each block in captured image data. If the color evaluation value is included in a white detection region, the block is determined to be white. By calculating an integrated value of the pixels in the block determined to be white, a white balance coefficient is calculated.

However, such white balance control has the following problems. In conventional white balance control, since white needs to be detected for an arbitrary light source, the white detection region is widely set in advance. Thus, depending on the type of light source, the color evaluation value of a chromatic color can be included in the white detection region. In this case, since the chromatic color is erroneously detected as white, there are scenes in which desired white balance control cannot be executed. For example, in a scene in which skin-color objects, such as a wooden floor and cardboard boxes under fluorescent light, occupy a large portion of the image data, when white is detected in white balance control, the skin-color chromatic color such as the wooden floor and cardboard boxes can erroneously be detected as white. As a result, an image having a cooler color tone than it actually looks is generated.

Japanese Patent No. 4320998, discusses a method for calculating a new control value. More specifically, when a change is caused between previous conditional information and current conditional information, a previous control value recorded in a recording unit is combined with a control value obtained based on the current conditional information, to calculate a new control value.

However, since the technique discussed in Japanese Patent No. 4320998, requires not only the current conditional information but also the previous conditional information, the control operation cannot be executed only with the current conditional information. Thus, for example, the technique discussed in Japanese Patent No. 4320998, cannot be applied to white balance control executed when a single still image is captured.

SUMMARY OF THE INVENTION

The present disclosure is directed to an image processing apparatus capable of providing an image desirable for a user by generating image data having a color tone closer to an actual color tone even when capturing a chromatic color object that can erroneously be determined to be white.

According to an aspect of the present disclosure, an image processing apparatus includes a first calculation unit configured to calculate a first white balance correction value for correcting white balance for image data based on a pixel value in a divided region, among a plurality of divided regions into which the image data is divided, where a color evaluation value is within a predetermined color range, and a second calculation unit configured to calculate, if the first white balance correction value is at a high temperature side of a predetermined threshold value, a second white balance correction value for correcting white balance for the image data based on a pixel value in a divided region within a color range where a color range at a low temperature side of the predetermined color range is limited.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

Figure 1:
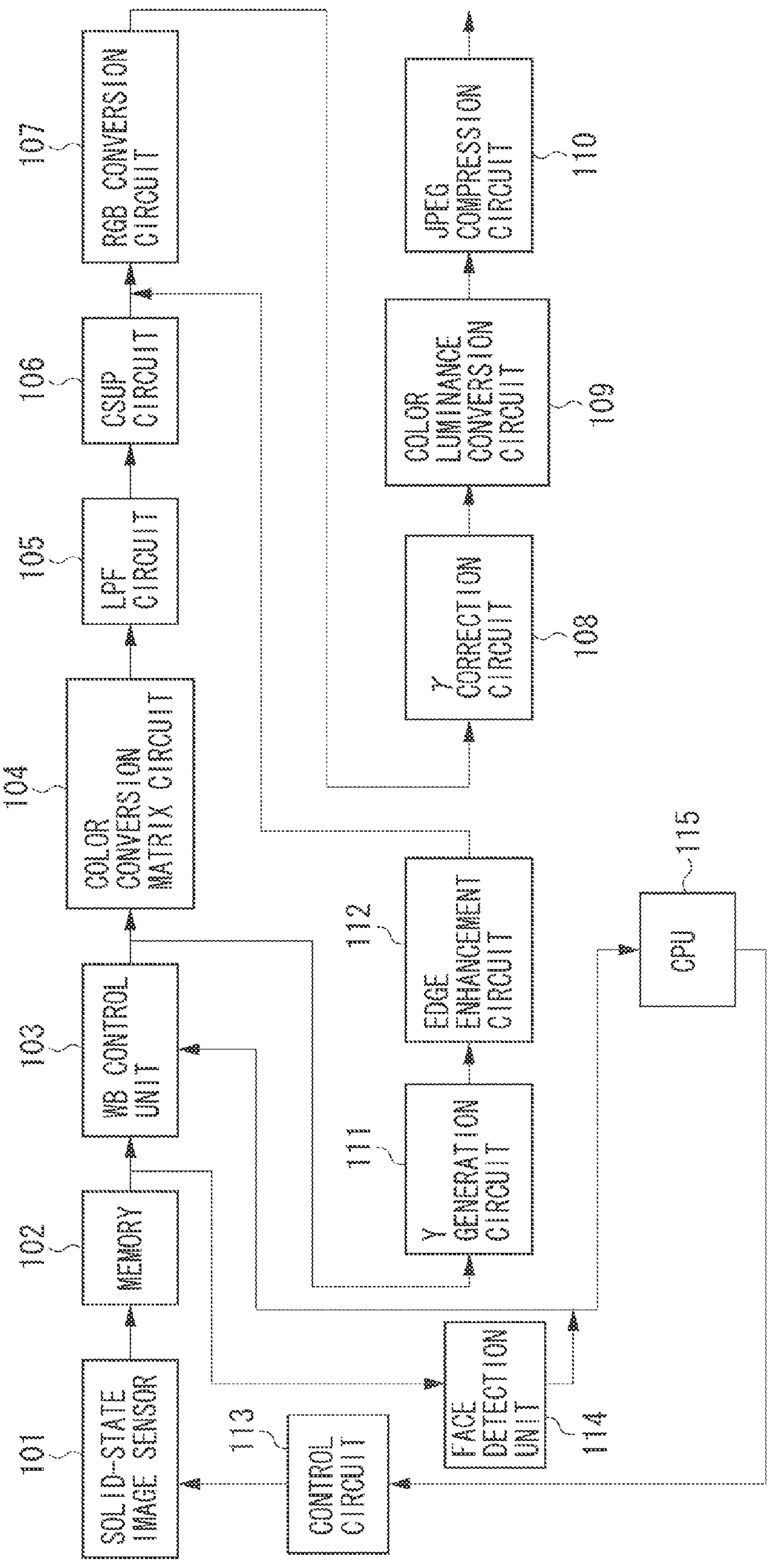
FIG. 1 illustrates a configuration of an imaging apparatus according to an exemplary embodiment of the present disclosure.

FIG. 1 illustrates a configuration of an imaging apparatus according to an exemplary embodiment of the present disclosure. In FIG. 1, the imaging apparatus includes a solid-state image sensor 101 including a charge-coupled device (CCD) sensor or a complementary metal oxide semiconductor (CMOS) sensor. Since the solid-state image sensor 101 has a surface covered with Bayer-arrangement red, green, blue (RGB) color filters or the like, the imaging apparatus can capture color images. When an object image is formed on the solid-state image sensor 101, the solid-state image sensor 101 generates image data (an image signal). The image data generated by the solid-state image sensor 101 is stored in a memory 102.

A central processing unit (CPU) 115 calculates a shutter speed and an aperture value for increasing the luminance of the entire image and calculates a focus lens drive amount for focusing an object in a focus region. The exposure values (the shutter speed and the aperture value) and the focus lens drive amount calculated by the CPU 115 are output to a control circuit 113, which executes control operations based on these values. A white balance (WB) control unit 103 calculates a WB correction value based on the image data stored in the memory 102 and executes WB correction on the image data stored in the memory 102 by using the calculated WB correction value. A calculation method of this WB correction value executed by the WB control unit 103 will be described in detail below.

After the WB control unit 103 executes the WB correction, a color conversion matrix (MTX) circuit 104 applies color gain to convert the corrected image data into color-difference signals R-Y and B-Y, so that the image data is reproduced in optimum colors. A low-pass filter (LPF) circuit 105 limits bandwidths of the color-difference signals R-Y and B-Y. A chroma suppress (CSUP) circuit 106 suppresses the false color signal of a saturate portion in the image data, the bandwidths of which have been limited by the LPF circuit 105. After executing the WB correction on the image data, the WB control unit 103 also outputs the corrected image data to a luminance signal (Y) generation circuit 111. The luminance signal generation circuit 111 generates a luminance signal Y from the output image data. An edge enhancement circuit 112 executes an edge enhancement process on the generated luminance signal Y.

An RGB conversion circuit 107 converts the color-difference signals R-Y and B-Y output from the CSUP circuit 106 and the luminance signal Y output from the edge enhancement circuit 112 into an RGB signal. A gamma (Y) correction circuit 108 executes gradation correction on the converted RGB signal. After the gradation correction, a color luminance conversion circuit 109 converts the RGB signal into a YUV signal. A Joint Photographic Experts Group (JPEG) compression circuit 110 compresses the YUV signal output from the color luminance conversion circuit 109 in JPEG format or the like and stores the signal as image data in an external recording medium or an internal recording medium. A face detection unit 114 detects a face region from the image data.

Figure 2:
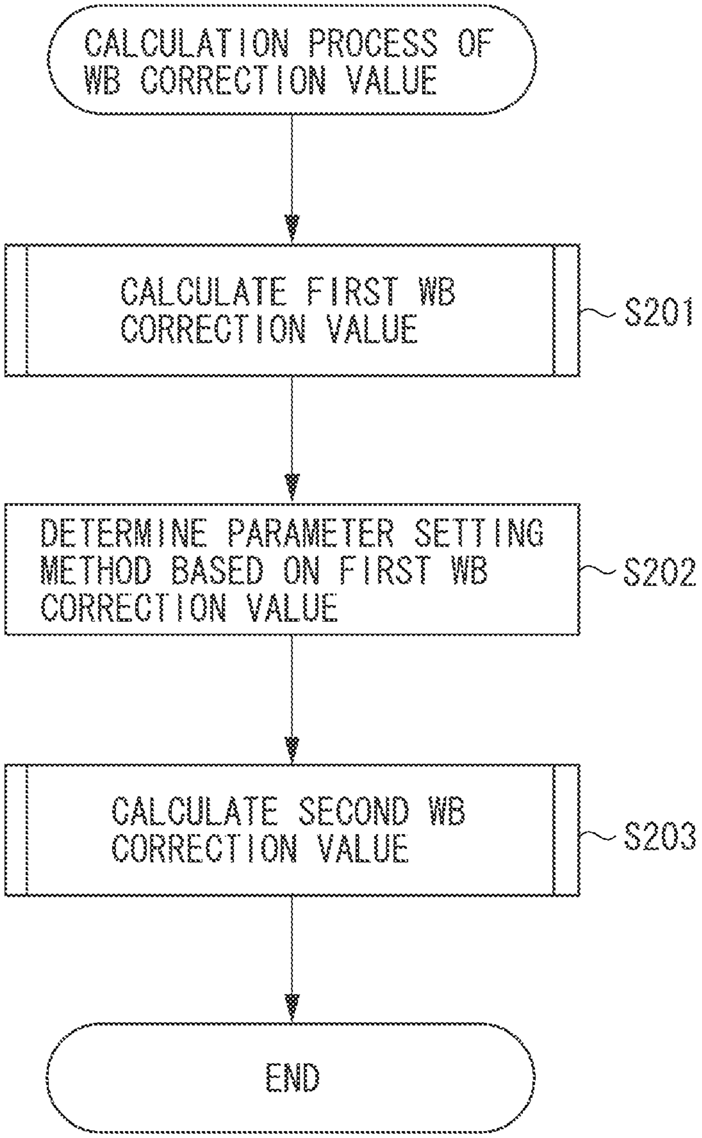
FIG. 2 is a flow chart illustrating a calculation method of a WB correction value executed by a WB control unit.

FIG. 2 is a flow chart illustrating a calculation method of a WB correction value executed by the WB control unit 103. The process illustrated in FIG. 2 is realized by causing the CPU 115 to read necessary data and programs from a read-only memory (ROM) or the like, execute the necessary data and programs, and control the WB control unit 103. In step S201, the WB control unit 103 calculates a first WB correction value (first white balance correction value). Step S201 is an example of processing executed by a first calculation unit.

Figure 3:
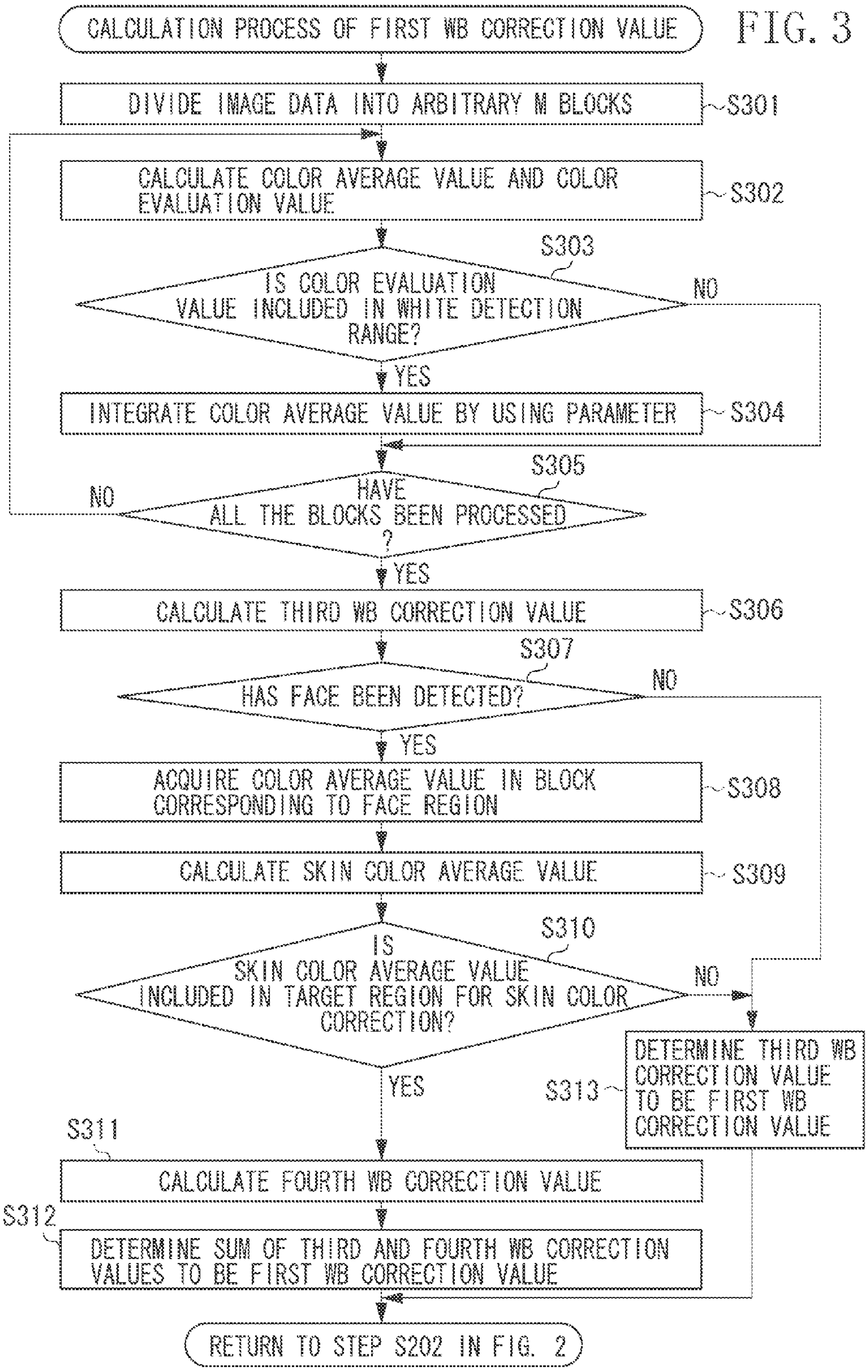
FIG. 3 illustrates a calculation process of a first WB correction value.

FIG. 3 is a flow chart illustrating step S201 in FIG. 2 in detail. Hereinafter, the calculation process of the first WB correction value in step S201 will be described in detail with reference to FIG. 3.

In step S301, the WB control unit 103 reads image data stored in the memory 102 and divides the image data into arbitrary m blocks. In step S302, the WB control unit 103 executes averaging on the pixel values for each color and calculates a color average value (R[i], G[i], B[i]) per block (1, to m). Next, the WB control unit 103 calculates a color evaluation value (Cx[i], Cy[i]) by using the following equations (1).

$$Cx[i]=(R[i]-B[i])/Y[i]\times 1024$$

$$Cy[i]=(R[i]+B[i]-2G[i])/Y[i]\times 1024$$

$$\text{where } Y[i]=(R[i]+2G[i]+B[i])/4 \tag{1}$$

Figure 4:
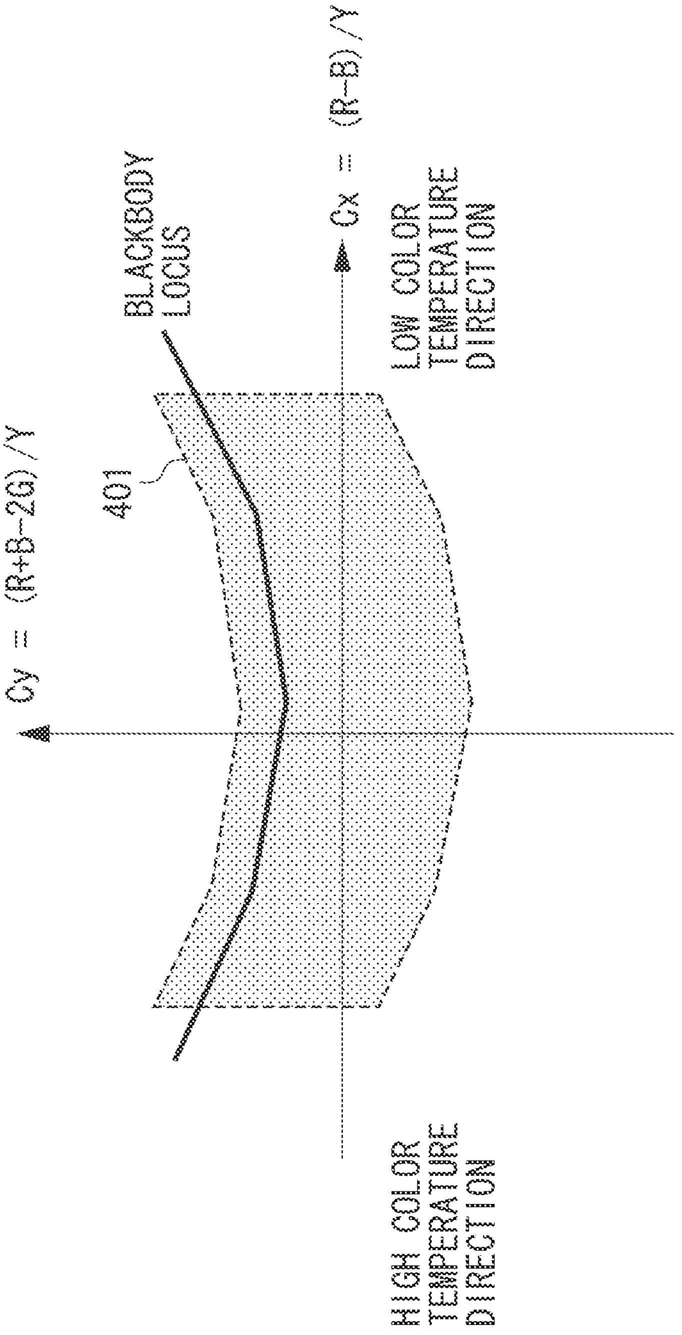
FIG. 4 is a graph used when white is detected.

The WB control unit 103 detects white by using a graph including a coordinate axis (a blackbody locus) as illustrated in FIG. 4. In FIG. 4, the negative direction of the x-coordinate (Cx) represents a color evaluation value obtained when white of a higher-color-temperature object is captured, and the positive direction represents a color evaluation value obtained when white of a lower-color-temperature object is captured. The y-coordinate (Cy) signifies the degree of a green component of a light source, and the green component increases as the y-coordinate shifts in the negative direction, which indicates that the light source is fluorescent light.

In step S303, the WB control unit 103 determines whether the color evaluation value (Cx[i], Cy[i]) of the i-th block calculated in step S302 is included in a preset white detection range 401. The white detection range 401 is set by imaging white under different light sources and plotting calculated color evaluation values. This white detection range 401 can be varied and set, depending on the shooting mode. If the color evaluation value (Cx[i], Cy[i]) is included in the white detection range 401 (YES in step S303), the operation proceeds to step S304. If not (NO in step S303), the operation proceeds to step S305 by skipping step S304.

In step S304, the WB control unit 103 determines that the i-th block is white and integrates the color average value (R[i], G[i], B[i]) of the block. If step S304 is skipped, the WB control unit 103 does not integrate (add) the color average value of the block, and the operation proceeds to step S305. These steps S303 and S304 can be represented by the following equations (2).

$$SumR=\sum_{i=0}^{m} Sw[i]\times \text{Weight}[i]\times R[i] \tag{2}$$

$$SumG=\sum_{i=0}^{m} Sw[i]\times \text{Weight}[i]\times G[i]$$

$$SumB=\sum_{i=0}^{m} Sw[i]\times \text{Weight}[i]\times B[i]$$

In the above equations, when the color evaluation value (Cx[i], Cy[i]) is included in the white detection range 401, a parameter Sw[i] is set to 1. When the color evaluation value (Cx[i], Cy[i]) is not included in the white detection range 401, the parameter Sw[i] is set to 0. In this way, integration of the color average value (R[i], G[i], B[i]) is practically executed in steps S303 and S304. In addition, a parameter Weight[i] in the above equations is determined based on the method illustrated in FIGS. 5A and 5B, for example.

Figure 5A:
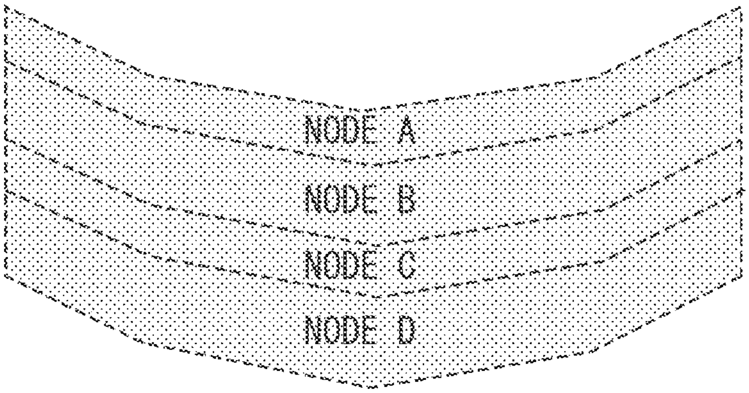
FIGS. 5A and 5B illustrate a parameter determination method.
Figure 5B:
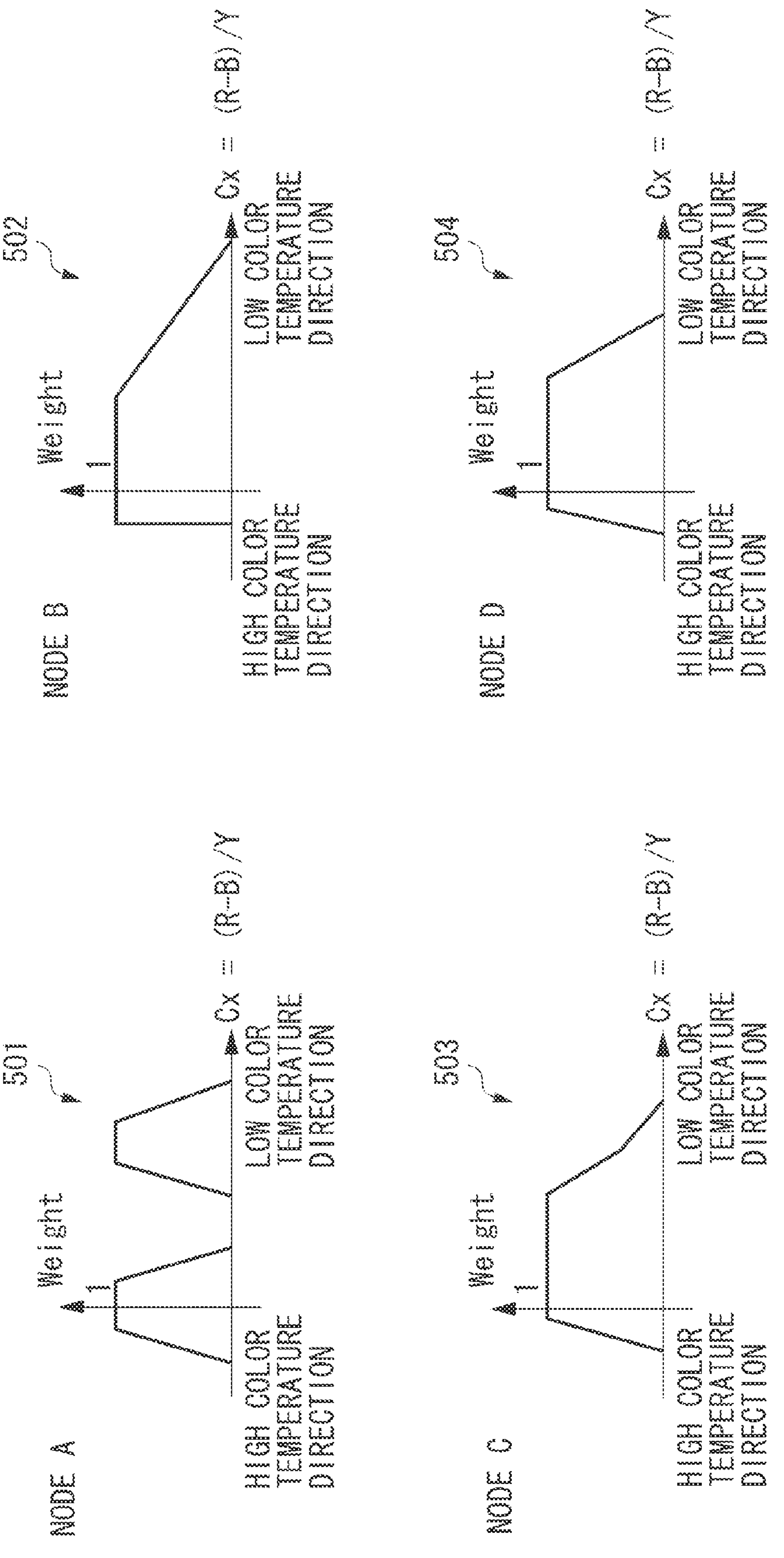

FIG. 5A illustrates the white detection range 401 in FIG. 4, which is divided into four nodes (nodes A to D). The WB control unit 103 determines which one of the four nodes that the color evaluation value (Cx[i], Cy[i]) belongs to and sets the parameter Weight[i] based on a parameter setting method corresponding to the determined node. FIG. 5B illustrates the parameter setting methods corresponding to the respective nodes. Namely, graphs 501 to 504 in FIG. 5B illustrate the parameter setting methods corresponding to the respective nodes A to D. The WB control unit 103 determines which one of nodes A to D that the i-th block belongs to. Next, the WB control unit 103 refers to the parameter setting method corresponding to the determined node (a relationship between the color evaluation value Cx[i] and the parameter Weight[i] of the i-th block) and acquires parameter Weight[i].

In step S305, the WB control unit 103 determines whether steps S302 to S304 have been executed on all the blocks. If all the blocks have been processed (YES in step S305), the operation proceeds to step S306. If not (NO in step S305), the operation returns to step S302.

In step S306, the WB control unit 103 uses the following equations (3) using the integrated value (SumR1, SumG1, SumB1) of the color average value, to calculate a third WB correction value (WBCol_, R3, WBCol_, G3, WBCol_, B3).

$$WBCol\_R3=SumY1\times1024/SumR1$$

$$WBCol\_G3=SumY1\times1024/SumG1$$

$$WBCol\_B3=SumY1\times1024/SumB1$$

$$\text{where } SumY1=(SumR1+2\times SumG1+SumB1)/4 \quad (3)$$

Next, in step S307, the face detection unit 114 determines whether a face region has been detected. While it is appropriate that the face region is captured from the image data used as the WB correction target, a face region may be detected from other previously-captured image data. If a face region is detected (YES in step S307), the operation proceeds to step S308. If not (NO in step S307), the operation proceeds to step S313. In step S313, the WB control unit 103 determines the third WB correction value (third white balance correction value) calculated in step S306 to be the first WB correction value.

In step S308, the WB control unit 103 acquires a color average value (FR, FG, FB) for each of the blocks corresponding to the face region (for example, the blocks each being entirely included in the face region). In cases in which the face region is not detected on a block basis, not only the blocks that are entirely included in the face region, but also other blocks may be determined to correspond to the face region. For example, if a predetermined ratio (for example, 50% or more) of a block is included in the face region, this block may be determined to correspond to the face region.

In step S309, the WB control unit 103 multiplies the color average value (FR, FG, FB) acquired in step S308 by the third WB correction value (WBCol_, R3, WBCol_, G3, WBCol_, B3), to obtain a skin color average value (SR, SG, SB). The skin color average value (SR, SG, SB) is a value obtained by correcting the color average value of the face region by the third WB correction value. The skin color average value is an example of a skin color evaluation value. Namely, the skin color average value (SR, SG, SB) can be obtained by the following equations (4).

$$SR=FR\times WBCol\_R3$$

$$SG=FG\times WBCol\_G3$$

$$SB=FB\times WBCol\_B3 \quad (4)$$

In step S310, the WB control unit 103 determines whether the skin color average value (SR, SG, SB) is included in the skin color correction target region.

Figure 6:
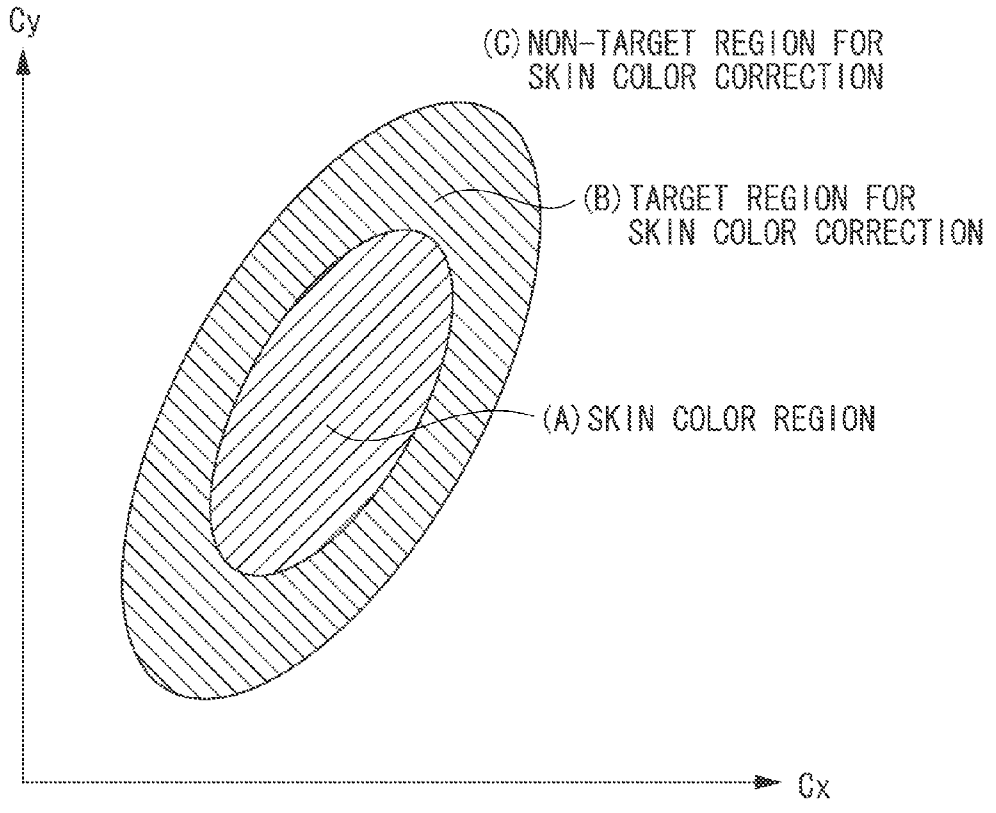
FIG. 6 illustrates a skin color region, a target region for skin color correction, and a non-target region for skin color correction.

FIG. 6 illustrates a skin color region, a target region for skin color correction, and a non-target region for skin color correction. In FIG. 6, the skin color region (A) corresponds to a first color signal region, the target region for skin color correction (B) corresponds to a second color signal region, which is a peripheral region having a difference value from the first color signal region within a predetermined range. In FIG. 6, since a Cx- and Cy-coordinate system is used as a predetermined color space coordinate system, the WB control unit 103 converts the RGB data into Cx=SR−SB and Cy=SR+SB−2SG, that is, color-difference signals, to make this determination. Of course, an arbitrary color space may be used to make this determination, by applying a known color space conversion method. For example, the skin color region (A) and the target region for skin color correction (B) illustrated in FIG. 6 can be set by capturing skin color images a plurality of times under white light such as under sunlight (daylight) and using a statistical method. Information for determining the skin color region (A) and the target region for skin color correction (B) may previously be registered in the WB control unit 103. Alternatively, such information may be stored in another storage device and the WB control unit 103 may refer to the information when necessary.

If the skin color average value is included in the skin color region (A) in FIG. 6 (NO in step S310), the WB control unit 103 determines that WB of the skin color has appropriately been corrected by the third WB correction value. Thus, in step S313, the WB control unit 103 determines the third WB correction value to be the first WB correction value. If the skin color average value is in the non-target region for skin color correction (C) (NO in step S310), the operation proceeds to step S313. In step S313, the WB control unit 103 determines that the skin color average value does not represent human skin. Thus, the WB control unit 103 determines the third WB correction value to be the first WB correction value. In contrast, if the skin color average value is included in the target region for skin color correction (B) (YES in step S310), the WB control unit 103 determines that WB of the skin color has not appropriately been corrected by the third WB correction value. Thus, in step S311, the WB control unit 103 calculates a fourth WB correction amount to correct the difference value between the skin color average value and the skin color region (A).

Figure 7:
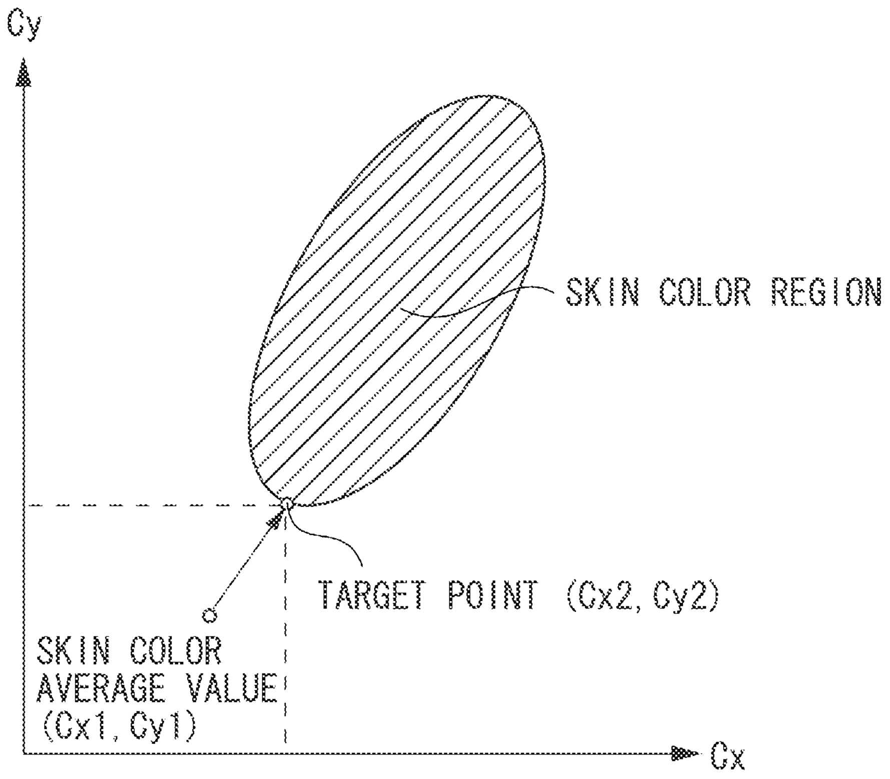
FIG. 7 illustrates a calculation method of a correction amount for minimizing the distance between a skin color average value and a skin color region.

As illustrated in FIG. 7, the WB control unit 103 calculates a correction amount to minimize the distance between the skin color average value and the skin color region (A). Namely, the WB control unit 103 uses coordinates (Cx1, Cy1) of the skin color average value and coordinates (Cx2,, Cy2) of a point (target point) that is within the skin color region (A) and is closest to the skin color average value, to calculate a correction amount based on the following equations (5).

$$\Delta Cx=Cx2-Cx1$$

$$\Delta Cy=Cy2-Cy1 \quad (5)$$

The WB control unit 103 determines the correction amount (ΔCx, ΔCy) to be a fourth WB correction value ΔFW (fourth white balance correction value). In step S311, the WB control unit 103 uses the coordinates as the skin color target value, so that the distance between the skin color average value and the skin color region (A) is minimized. In this way, even if the skin color is corrected excessively by the third WB correction value, the skin color falls within an appropriate skin color range. Thus, the skin color target value may be set within the skin color region (A). Next, in step S312, the WB control unit 103 determines the sum of the fourth WB correction value ΔFW and the third WB correction value calculated in the above way to be the first WB correction value.

Figure 8:
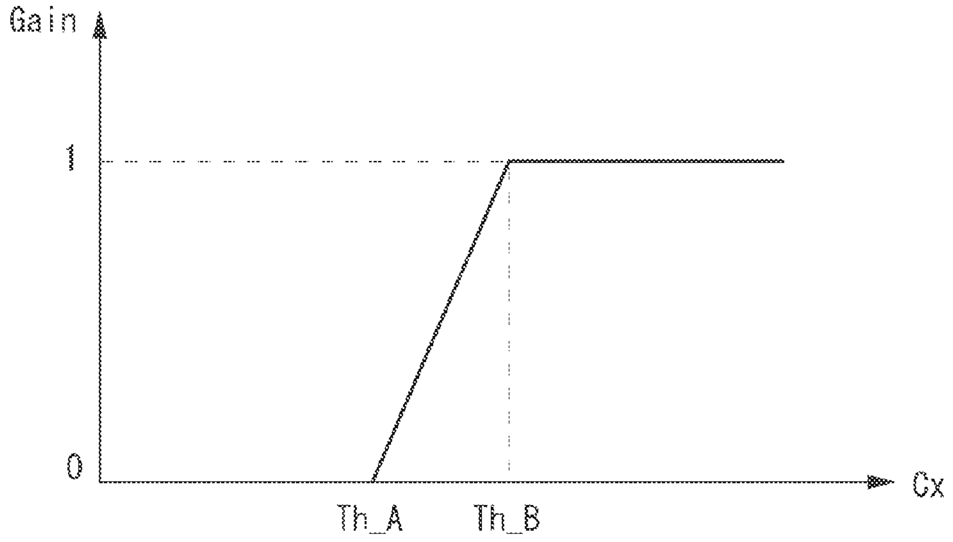
FIG. 8 illustrates a relationship between the first WB correction value and a gain value.

Next, a process of determining a parameter setting method based on the first WB correction value in step S202 in FIG. 2 will be described. To determine whether an object is illuminated by a lower-color-temperature light source under the imaging environment, for example, the WB control unit 103 refers to FIG. 8 illustrating a relationship between the first WB correction value (Cx) and a gain value (Gain) and determines a gain value (Gain) corresponding to the first WB correction value (Cx). If the first WB correction value (Cx) ≤Th_, A (threshold A), the WB control unit 103 determines that the gain value (Gain)=0. In this case, the WB control unit 103 determines that the object is not illuminated by a lower-color-temperature light source and determines a parameter setting method illustrated in FIG. 9 to prevent detection of white in the lower-color-temperature direction.

Figure 9:
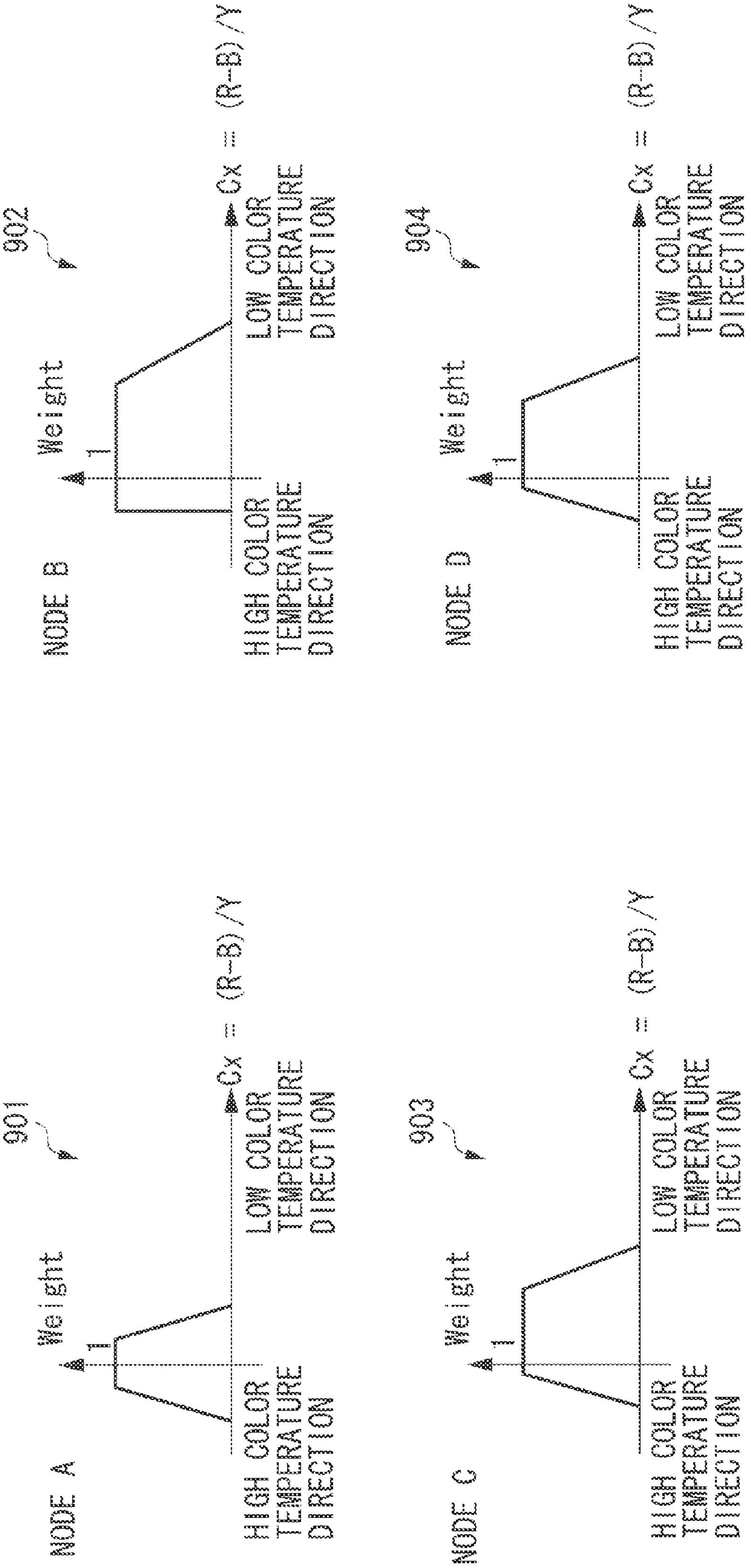
FIG. 9 illustrates a parameter determination method.

FIG. 9 illustrates parameter setting methods that are used when the object is not illuminated by a lower-color-temperature light source and that correspond to the respective nodes. Namely, FIG. 9 illustrates parameter setting methods 901 to 904 corresponding to nodes A to D, respectively, when the object is not illuminated by a lower-color-temperature light source.

In addition, if the first WB correction value (Cx)≥Th_, B (threshold B), the WB control unit 103 determines that the gain value (Gain)=1. In this case, the WB control unit 103 determines that the object is illuminated by a lower-color-temperature light source and determines a parameter setting method in FIG. 5. If Th_, A<first WB correction value (Cx) <Th_, B, the WB control unit 103 determines the gain value (Gain) as a combination ratio from within the range 0<gain value (Gain)<1. In this case, the WB control unit 103 uses the following equation (6) to execute a linear interpolation process on coordinates (ex. Point1) of each point in the graph in FIG. 5 and coordinates (ex. Point2) of each point in the graph in FIG. 9 and determines a parameter setting method.

$$\text{FinalPoint}=\text{Point1}*\text{Gain}+\text{Point2}*(1-\text{Gain}) \qquad (6)$$

The coordinates (ex. Point1) of each point in the graph in FIG. 5 and the coordinates (ex. Point2) of each point in the graph in FIG. 9 are examples of first and second parameters, respectively.

Figure 10:
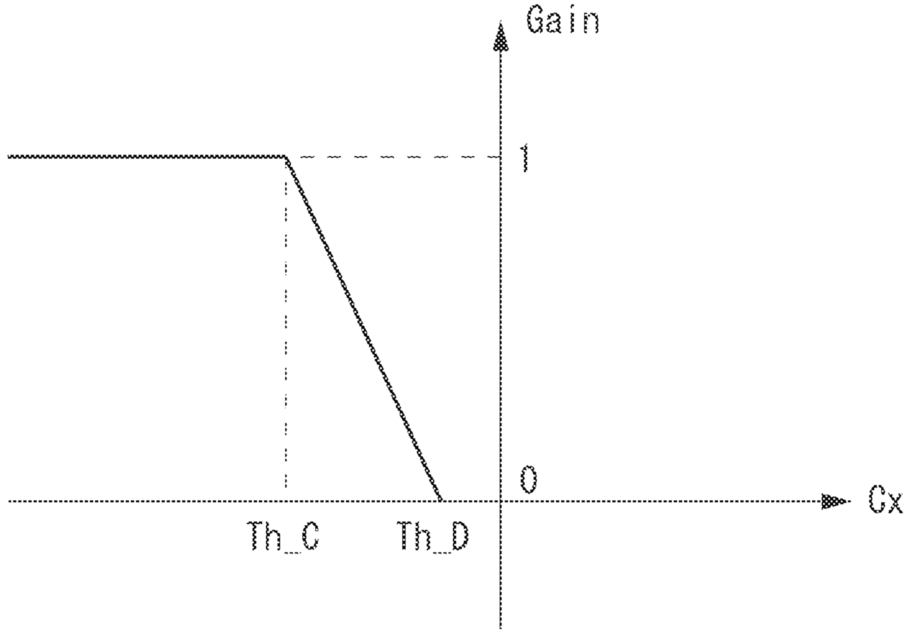
FIG. 10 illustrates a relationship between the first WB correction value and the gain value.

In addition, in the process of determining a parameter setting method, a parameter setting method may be determined depending on whether the object is illuminated by a higher-color-temperature light source under the imaging environment. In this case, for example, the WB control unit 103 refers to FIG. 10 illustrating a relationship between the first WB correction value (Cx) and the gain value (Gain) and determines a gain value (Gain) corresponding to the first WB correction value (Cx). Namely, if the first WB correction value (Cx)≤Th_, C (threshold C), the WB control unit 103 determines that the gain value (Gain)=1. In this case, the WB control unit 103 determines that the object is illuminated by a higher-color-temperature light source and determines a parameter setting method in FIG. 5. If the first WB correction value (Cx)≥Th_, D (threshold D), the WB control unit 103 determines that the gain value (Gain)=0. In this case, the WB control unit 103 determines that the object is not illuminated by a higher-color-temperature light source and determines a parameter setting method illustrated in FIG. 11 to prevent detection of white in the higher-color-temperature direction.

Figure 11:
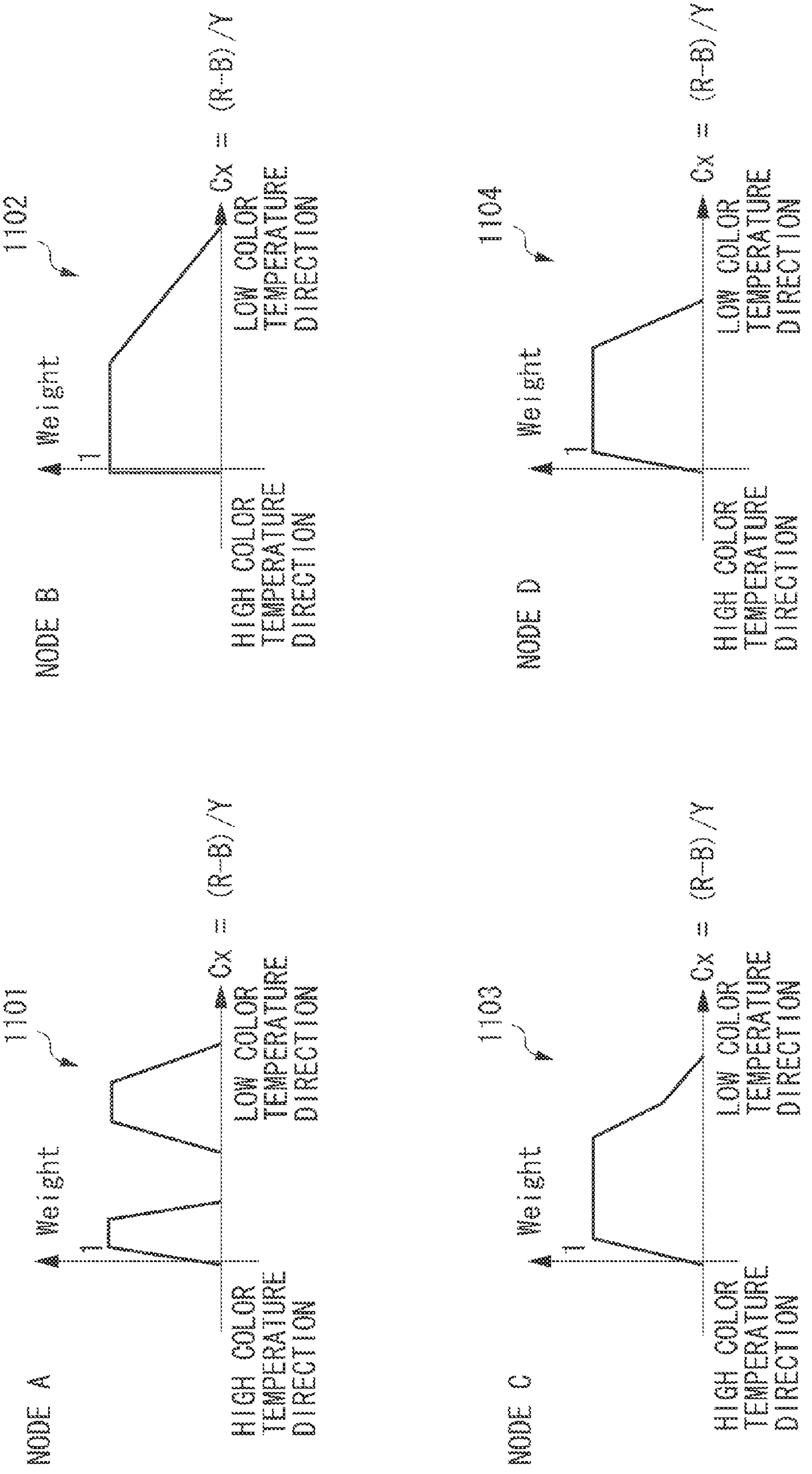
FIG. 11 illustrates a parameter determination method.

FIG. 11 illustrates parameter setting methods that are used when the object is not illuminated by a higher-color-temperature light source and that correspond to the respective nodes. Namely, FIG. 11 illustrates parameter setting methods 1101 to 1104 corresponding to nodes A to D, respectively, when the object is not illuminated by a higher-color-temperature light source.

In addition, if Th_, C<first WB correction value (Cx)<Th_, D, the WB control unit 103 determines a gain value (Gain) from within the range 1>gain value (Gain)>0. In this case, the WB control unit 103 uses the following equation (7) to execute a linear interpolation process on coordinates (ex. Point1) of each point in the graph in FIG. 5 and coordinates (ex. Point3) of each point in the graph in FIG. 11 and determines a parameter setting method.

$$\text{FinalPoint}=\text{Point1}*\text{Gain}+\text{Point3}*(1-\text{Gain}) \qquad (7)$$

Next, a process of calculating a second WB correction value (second white balance correction value) in step S203 in FIG. 2 will be described. In step S203, the WB control unit 103 uses the parameter setting method determined in step S202 to calculate a second WB correction value. The calculation process of the second correction value is the same as the calculation process of the first WB correction value described with reference to FIG. 3. However, in the calculation process of the second WB correction value, in a process corresponding to step S304 in FIG. 3, the parameter Weight[i] is acquired by the parameter setting method determined in step S202 in FIG. 2, and integration of the color average value is executed. In addition, in a process corresponding to step S306 in FIG. 3, a fifth WB correction value (fifth white balance correction value) is calculated from the obtained integrated value. In a process corresponding to step S310 in FIG. 3, if the WB control unit 103 determines that the skin color average value is not included in the target region for skin color correction, the WB control unit 103 determines the fifth WB correction value to be the second WB correction value in a process corresponding to step S313 in FIG. 3. In contrast, in the process corresponding to step S310 in FIG. 3, if the WB control unit 103 determines that the skin color average value is included in the target region for skin color correction, the WB control unit 103 calculates a sixth WB correction value (sixth white balance correction value) ΔFW for correcting the difference value between the skin color average value and the skin color region in a process corresponding to step S311 in FIG. 3. Next, in a process corresponding to step S312 in FIG. 3, the WB control unit 103 determines the sum of the sixth WB correction value ΔFW and the fifth WB correction value to be the second WB correction value. It is desirable that the sixth WB correction value ΔFW be controlled to be larger than the fourth WB correction value ΔFW. This is because, since the white detection region can be limited in step S202, accuracy of the fifth WB correction value as a WB correction value can be improved as compared with the third WB correction value and reliability of the skin color correction can be increased. Step S203 is an example of processing executed by a second calculation unit.

The image processing apparatus according to the present exemplary embodiment uses the second WB correction value calculated in step S203 to develop image data stored in the memory 102. In this way, the image processing apparatus according to the present exemplary embodiment can provide an image desirable for a user by generating image data having a color tone closer to an actual color tone even when capturing a chromatic color object that can erroneously be determined to be white.

Next, an operation during continuous imaging such as capturing of a moving image according to another exemplary embodiment of the present disclosure will be described. Another exemplary embodiment according to the present disclosure is different from the above exemplary embodiment in the process of calculating the first WB correction value. Namely, in the process of calculating the first WB correction value according to another exemplary embodiment, image data (first image data) captured in the last frame is used. The other steps in the process of calculating the first WB correction value are the same as those according to the above exemplary embodiment. In addition, the parameter (Weight) determination process, the second WB correction value calculation process, and the like, which are after the calculation process of the first WB correction value, are executed on the image data (second image data) captured in the current frame, as in the above exemplary embodiment. As in the above exemplary embodiment, the image processing apparatus according to another exemplary embodiment can also provide an image desirable for a user by generating image data having a color tone closer to an actual color tone even when capturing a chromatic color object that can erroneously be determined to be white.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-099003, filed Apr. 24, 2012, which is hereby incorporated by reference herein in its entirety.

What is claimed is:

1. An image processing apparatus comprising:

a first calculation unit configured to calculate a first white balance correction value for correcting white balance for image data based on a pixel value in a divided region, among a plurality of divided regions into which the image data is divided, where a color evaluation value is within a predetermined color range; and a second calculation unit configured to calculate, if the first white balance correction value is at a high temperature side of a predetermined threshold value, a second white balance correction value for correcting white balance for the image data based on a pixel value in a divided region within a color range where a color range at a low temperature side of the predetermined color range is limited.

2. The image processing apparatus according to claim 1, wherein the second calculation unit calculates, if the first white balance correction value is at the high temperature side of the predetermined threshold value, the second white balance correction value for correcting white balance for the image data based on an integration value of a pixel value in a divided region within a color range where a color range at the low temperature side is more limited than when the first white balance correction value is at the low temperature side of the predetermined threshold value.

3. The image processing apparatus according to claim 1, wherein the first calculation unit calculates a third white balance correction value from the image data by using a blackbody locus, detects a predetermined region from the image data, and acquires an evaluation value of a predetermined color by applying the third white balance correction value to the predetermined region, and wherein, if the evaluation value is not included in the predetermined color range, the first calculation unit calculates a fourth white balance correction value so that the evaluation value is corrected to be included in the predetermined color range and calculates the first white balance correction value based on the third white balance correction value and the fourth white balance correction value.

4. The image processing apparatus according to claim 3, wherein, if the predetermined region is not detected from the image data, the first calculation unit determines the third white balance correction value to be the first white balance correction value.

5. The image processing apparatus according to claim 3, wherein, if the evaluation value is included in the predetermined color range, the first calculation unit determines the third white balance correction value to be the first white balance correction value.

6. The image processing apparatus according to claim 1, wherein the second calculation unit calculates a fifth white balance correction value from the image data by using a blackbody locus, detects a predetermined region from the image data, and acquires an evaluation value of a predetermined color by applying the fifth white balance correction value to the predetermined region, and wherein, if the evaluation value is not included in the predetermined color range, the second calculation unit calculates a sixth white balance correction value so that the evaluation value is corrected to be included in the predetermined color range and calculates the second white balance correction value based on the fifth white balance correction value and the sixth white balance correction value.

7. The image processing apparatus according to claim 6, wherein, if the predetermined region is not detected from the image data, the second calculation unit determines the fifth white balance correction value to be the second white balance correction value.

8. The image processing apparatus according to claim 6, wherein, if the evaluation value is included in the predetermined color range, the second calculation unit determines the fifth white balance correction value to be the second white balance correction value.

9. The image processing apparatus according to claim 1, wherein the first calculation unit calculates a third white balance correction value from the image data by using a blackbody locus, detects a predetermined region from the image data, and acquires an evaluation value of a predetermined color by applying the third white balance correction value to the predetermined region, wherein, if the evaluation value is not included in the predetermined color range, the first calculation unit calculates a fourth white balance correction value so that the evaluation value is corrected to be included in the predetermined color range, wherein the second calculation unit calculates a fifth white balance correction value from the image data by using a blackbody locus, detects a predetermined region from the image data, and acquires an evaluation value of a predetermined color by applying the fifth white balance correction value to the predetermined region, and wherein, if the evaluation value is not included in the predetermined color range, the second calculation unit calculates a sixth white balance correction value so that the evaluation value is corrected to be included in the predetermined color range and controls the sixth white balance correction value to be larger than the fourth white balance correction value.

10. The image processing apparatus according to claim 1, further comprising:

a determination unit configured to determine a combination ratio based on the first white balance correction value and determine a parameter by combining a predetermined first parameter and a predetermined second parameter based on the combination ratio.

11. The image processing apparatus according to claim 10, wherein, if the first white balance correction value is less than a predetermined value, the determination unit determines the parameter so that white in a low-color-temperature direction is not detected.

12. The image processing apparatus according to claim 10, wherein, if the first white balance correction value is greater than a predetermined value, the determination unit determines the parameter so that white in a high-color-temperature direction is not detected.

13. An image processing apparatus comprising:

a first calculation unit configured to calculate a first white balance correction value based on a pixel value in a divided region, among a plurality of divided regions into which first image data is divided, where a color evaluation value is within a predetermined color range; and a second calculation unit configured to calculate, if the first white balance correction value is at a high temperature side of a predetermined threshold value, a second white balance correction value for correcting white balance for second image data based on a pixel value in a divided region within a color range where a color range at a low temperature side of the predetermined color range is limited.

14. An image processing method executed by an image processing apparatus, the image processing method comprising:

calculating a first white balance correction value for correcting white balance for image data based on a pixel value in a divided region, among a plurality of divided regions into which the image data is divided, where a color evaluation value is within a predetermined color range; and calculating, if the first white balance correction value is at a high temperature side of a predetermined threshold value, a second white balance correction value for correcting white balance for the image data based on a pixel value in a divided region within a color range where a color range at a low temperature side of the predetermined color range is limited.

15. An image processing method executed by an image processing apparatus, the image processing method comprising:

calculating a first white balance correction value based on a pixel value in a divided region, among a plurality of divided regions in which first image data is divided, where a color evaluation value is within a predetermined color range; and calculating, if the first white balance correction value is at a high temperature side of a predetermined threshold value, a second white balance correction value for correcting white balance for second image data based on a pixel value in a divided region within a color range where a color range at a low temperature side of the predetermined color range is limited.

16. A computer-readable storage medium storing a program for causing a computer to execute a method comprising:

calculating a first white balance correction value for correcting white balance for image data based on a pixel value in a divided region, among a plurality of divided regions into which the image data is divided, where a color evaluation value is within a predetermined color range; and calculating, if the first white balance correction value is at a high temperature side of a predetermined threshold value, a second white balance correction value for correcting white balance for the image data based on a pixel value in a divided region within a color range where a color range at a low temperature side of the predetermined color range is limited.

17. A computer-readable storage medium storing a program for causing a computer to execute a method comprising:

calculating a first white balance correction value based on a pixel value in a divided region, among a plurality of divided regions in which image data is divided, where a color evaluation value is within a predetermined color range; and calculating, if the first white balance correction value is at a high temperature side of a predetermined threshold value, a second white balance correction value for correcting white balance for the image data based on a pixel value in a divided region within a color range where a color range at a low temperature side of the predetermined color range is limited.

* * * * *